Patented Oct. 7, 1947

2,428,444

UNITED STATES PATENT OFFICE 2,428,444

ANTHELMINTIC COMPOSITIONS AND PROCESSES OF PREPARING SAME

John A. Whiting, Kansas City, Mo., assignor to Armour and Company, Chicago, Ill., a corporation of Illinois No Drawing. Application April 17, 1942, Serial No. 439,401

4 Claims. (Cl. 167—53)

This invention relates to anthelmintic compositions and processes for their preparation. It deals more particularly with nicotinic anthelmintic compositions suitable for animal administration wherein the toxic effects of the nicotine substance are reduced by the action of bentonite.

A great amount of work has been done in the field of anthelmintics by many investigators because the problem of ridding animals of internal parasites, such as various types of worms, without serious consequences to the host animal, is somewhat complex. Substances which are toxic to these parasites are usually toxic also to the host, and a nice balance is tried for in order to kill or inactivate the parasite so that it can be expelled without at the same time injuring the health of the infected animal. Another factor which complicates this situation is the fact that the alimentary systems of animals are invaded by many different kinds of worms. An agent which will attack one kind is frequently ineffective against one another or effective only in much larger doses. For these reasons it has been necessary in the past to give small doses in order to preserve the well being of the animal, but such amounts when employed in the usual treatments are not effective to destroy completely all of the parasites commonly present.

A number of mixtures have hitherto been tried, including substances specific to different types of parasites, the mixtures being intended for treating simultaneously several types of infestations, but it still has remained necessary to limit the dosage in accordance with the toxic amounts of each constituents of the mixture. Also, it has not been possible to prepare desired mixtures in some cases because the substances are not compatible.

Some of the most commonly used substances for anthelmintic purposes are the nicotine substances such as nicotine or nicotine sulfate. However, the considerable toxicity of these substances necessitates very small doses. This makes it necessary to administer the nicotinic anthelmintic at frequent intervals, and in practical application the treatment is likely to be either injurious to the animal or ineffective to serve its purpose.

I have discovered that anthelmintic compositions of increased effectiveness can be prepared by incorporating bentonite with nicotine or its compounds. In the presence of bentonite, amounts of nicotine or its compounds can be administered which far exceed those which have been found to give toxic symptoms when otherwise administered.

It is an important advantage of my invention that nicotine or nicotine compounds can be administered to animals infested with parasites in amounts which are amply large to control the infestation effectively without the production of toxic symptoms in the host animal.

It is a further advantage of my invention that the administration of the nicotine material does not result in any destructive action upon the tissues or organs of the host with which it comes in contact.

Another substance heretofore used as an anthelmintic is phenothiazine. This substance is not highly toxic to the animal and its dosage need not be restricted below the effective amount. It has been found particularly effective in the removal of certain gastrointestinal worms. It would be very desirable to use phenothiazine along with nicotine substances to effect a more complete destruction of the different kinds of parasites, but this has hitherto not been possible because the nicotine materials cause curdling of the phenothiazine in the presence of water.

I have discovered further that when bentonite is employed along with the nicotine material and phenothiazine that curdling of the phenothiazine is prevented, and smooth mixtures of these effective substances can be obtained, these mixtures being especially effective in producing complete destruction of substantially all common types of parasites which infest domestic animals.

A further feature of my invention involves admixing a nicotine substance and bentonite with or without phenothiazine in feed materials to thus produce an animal feed which has anthelmintic properties.

Yet another feature of the invention involves incorporating the improved mixture of ingredients in a quantity of water to thus prepare a liquid suitable for drenching the animal.

In carrying out my invention I can mix a nicotine material, such as nicotine, nicotine sulfate, nicotine tartrate, or other nicotine substance with the type of clay ordinarily known as bentonite and sometimes referred to as colloidal clay.

It is possible that in my improved compositions wherein bentonite is employed in connection with a nicotine substance that the bentonite acts as an adsorbent toward the nicotine material and that the nicotine material is slowly leeched therefrom by the juices within the alimentary tract. This may be effective to make the nicotine or nicotine compound available at the site of infestation where it can immediately attack the parasite. On the other hand, it may be that the bentonite itself exerts some action upon the walls of the alimentary tract. It is known that this clay has a peculiar property of swelling in water and it is conceivable that this property may be related to its efficacy in my anthelmintic compositions, but its exact mode of operation with respect to such a toxic material as nicotine is not known.

Desirably, a material such as copper sulfate may be incorporated in the composition, the purpose of this ingredient being to cause the esophageal groove to contract so that, in administering this mixture to ruminants, it is carried directly to the abomasum and is immediately available at the site of infestation.

As a specific example of preparing an improved anthelmintic according to the invention, 20 grains of a 40% aqueous solution of nicotine sulfate (corresponding to 8 grains of nicotine) are admixed with 20 grains of copper sulfate, 20 grains of bentonite and 194 grains of phenothiazine with enough water to make one fluid ounce. In preparing this mixture the copper sulfate is dissolved in 0.5 fluid ounces of water and the nicotine sulfate added. The phenothiazine and the bentonite are thoroughly mixed together and this mixture then added to the nicotine-copper sulfate mixture with thorough agitation. There is then quickly added, with stirring, enough water to make one fluid ounce. A smooth compound is thus obtained. This compound then is mixed with water and administered to the animal as a drench, or is mixed with molasses or feed, such as grains, and fed to the animal in the usual way.

Alternately, the nicotine substance and bentonite can be mixed in the dry state and then mixed with water when it is to be administered. Where the compound is given to an adult sheep, for example, the amount given should preferably not be more than that amount containing 8 grains of nicotine. For a larger animal this amount may be increased and for a smaller animal should be reduced. One fluid ounce of the material obtained by the foregoing example can be administered to an adult sheep without the development of toxic symptoms. Hitherto not more than one-half dosage has been a safe amount to administer.

My improved anthelmintic compositions are effective on various types of animals, such as horses, cattle, hogs, and sheep, etc., and has been found especially good for the treatment of sheep which in many instances are quite sensitive to the toxic materials.

It is understood that the foregoing description is given for purpose of explanation only and that many changes and modifications may be made without departing from the spirit of the invention.

What I wish to claim is:

1. An anthelmintic composition comprising a nicotine substance, bentonite and phenothiazine.

2. A process for preparing an anthelmintic composition comprising mixing a nicotine substance, water and copper sulfate; mixing phenothiazine and bentonite; and mixing together the compositions obtained by each of said mixing steps.

3. A process for preparing an anthelmintic composition comprising mixing a nicotine substance with water, adding copper sulfate to the nicotine-water mixture, mixing phenothiazine and bentonite, and mixing together the aqueous nicotine-copper sulfate mixture with the mixture of phenothiazine and bentonite.

4. An anthelmintic composition comprising a nicotine substance, copper sulfate, bentonite, and phenothiazine.

JOHN A. WHITING.

REFERENCES CITED

The following references are of record in the file of this patent:

UNITED STATES PATENTS

| Number | Name | Date |
|---|---|---|
| 2,033,495 | Taylor | Mar. 10, 1936 |
| 2,096,566 | Smith | Oct. 19, 1937 |
| 2,033,856 | Smith | Mar. 10, 1936 |
| 2,294,888 | Austin | Sept. 8, 1942 |
| 2,277,680 | Bousquet | Mar. 31, 1942 |
| 1,839,970 | Konantz | Jan. 5, 1932 |

OTHER REFERENCES

Roberts, Journal of the Council of Scientific and Industrial Research, Aug. 1939 (Australia), vol. 12, page 208.

Carlson, Veterinary Medicine, vol. 34, page 48 (1939), Dept. of Agr. Lib.